(12) United States Patent
Zeidman

(10) Patent No.: US 11,684,859 B2
(45) Date of Patent: Jun. 27, 2023

(54) METHOD AND APPARATUS FOR REMOTE GAME PLAY WITH REAL-TIME COMMENTARY

(71) Applicant: Robert M. Zeidman, Las Vegas, NV (US)

(72) Inventor: Robert M. Zeidman, Las Vegas, NV (US)

(73) Assignee: Good Beat Games, Inc., Las Vegas, NV (US)

( * ) Notice: Subject to any disclaimer, the term of this patent is extended or adjusted under 35 U.S.C. 154(b) by 0 days.

(21) Appl. No.: 17/861,220

(22) Filed: Jul. 10, 2022

(65) Prior Publication Data

US 2022/0339547 A1    Oct. 27, 2022

Related U.S. Application Data

(63) Continuation of application No. 17/081,328, filed on Oct. 27, 2020, now Pat. No. 11,413,545.

(51) Int. Cl.
- *A63F 13/86* (2014.01)
- *G07F 17/32* (2006.01)
- *A63F 13/537* (2014.01)

(52) U.S. Cl.
CPC ............ *A63F 13/86* (2014.09); *A63F 13/537* (2014.09); *G07F 17/3272* (2013.01)

(58) Field of Classification Search
None
See application file for complete search history.

(56) References Cited

U.S. PATENT DOCUMENTS 10,086,291 B1 * 10/2018 Wisler .................. G06F 16/40
2017/0006322 A1 * 1/2017 Dury .................... H04N 21/254

\* cited by examiner

*Primary Examiner* — Damon J Pierce

(57) ABSTRACT

This invention allows the players of multiplayer games like poker, chess, backgammon, go, board games, and video games to play the game online while commenting on the game and explaining their strategies to an online audience without sharing that information with their opponents.

1 Claim, 9 Drawing Sheets

US 11,684,859 B2

METHOD AND APPARATUS FOR REMOTE GAME PLAY WITH REAL-TIME COMMENTARY

TECHNICAL FIELD

Embodiments of the present invention relate to a technical solution for enabling private and public communications among a group of individuals in different roles while playing an online game. The present invention allows the players to comment on the game and explain their strategies to a remote audience without sharing that information with their opponents.

BACKGROUND

Broadcasts of poker tournaments have become very popular since ways were devised to show each player's hidden "in-the-hole" cards to the camera while not allowing the competing players to see them and thus get an unfair advantage. The first method for exposing the cards to the audience involved glass plates in the tables in front of each player. Each player was required to slide their cards over the plate, to be seen by the camera below and broadcast to a television audience. Later technology involved cameras built into the sides of the poker tables. When the poker player lifted the cards to see them, the cards were broadcast to a television audience by the camera in the table. Modern technology has radio-frequency identification (RFID) transmitting circuitry built-into the playing cards and RFID detectors in the table. Each card's RFID circuit transmits the card number and suit to the RFID receiver in the table. This information is transmitted to a computer that compiles the information from all of the players and allows that information to be superimposed on the broadcast screen of the game.

If the card information were to be seen by another player, or seen by a player's accomplice and transmitted to a player, it would give that player an unfair advantage, so the broadcasts of the games are delayed by minutes. They can also be recorded and delayed by much longer times such as days or months.

One of the exciting features of televised poker games is the commentary by the announcers. These announcers are veteran poker players themselves, and they surmise why each play was made, its probability of succeeding, and what the player was most likely thinking when making a move. To become a better player, and to understand the game better and thus enjoy the game more, the audience members would prefer to hear from the players themselves to describe what the player was thinking at the moment of each play and to learn strategies directly from the players. However, speaking at the table would reveal the player's strategy to their opponents during the game, which would surely lead to their defeat. The games could be recorded and played back with the players reviewing the hands and providing after-the-fact commentary, but with hundreds of hands played in each hour, it would be difficult for the players to recall their thinking for each hand. Plus, this post-game commentary would require players and broadcasters to more than double the amount of time they spent on each game, significantly increasing the costs of broadcasting the games.

To optimize the game viewing experience, there needs to be a means to hear the thoughts of the players themselves, in a way that does not change the game by revealing competitive information to their opponents. The method for doing this should apply equally well to poker, chess, backgammon, go, board games, video games, and all multiplayer games.

A simple solution would be to put poker players in separate recording booths while they play, without visual access to each other, but this solution has a problem. A solution is needed that also enables the poker players to see each other at the game table because in poker in particular, viewing the other players gives clues about their state of mind and is critical to determining strategy. Some players watch other players' speech patterns, hand motions, facial tics, and even the pulsing of blood through veins on their neck. Plus, poker is a social game with banter and "smack talk" that enlivens the game not only for the players but for the audience.

BRIEF DESCRIPTION OF THE DRAWINGS

The present invention is illustrated by way of example, and not by way of limitation, in the figures of the accompanying drawings and in which.

DETAILED DESCRIPTION

Figure 1:
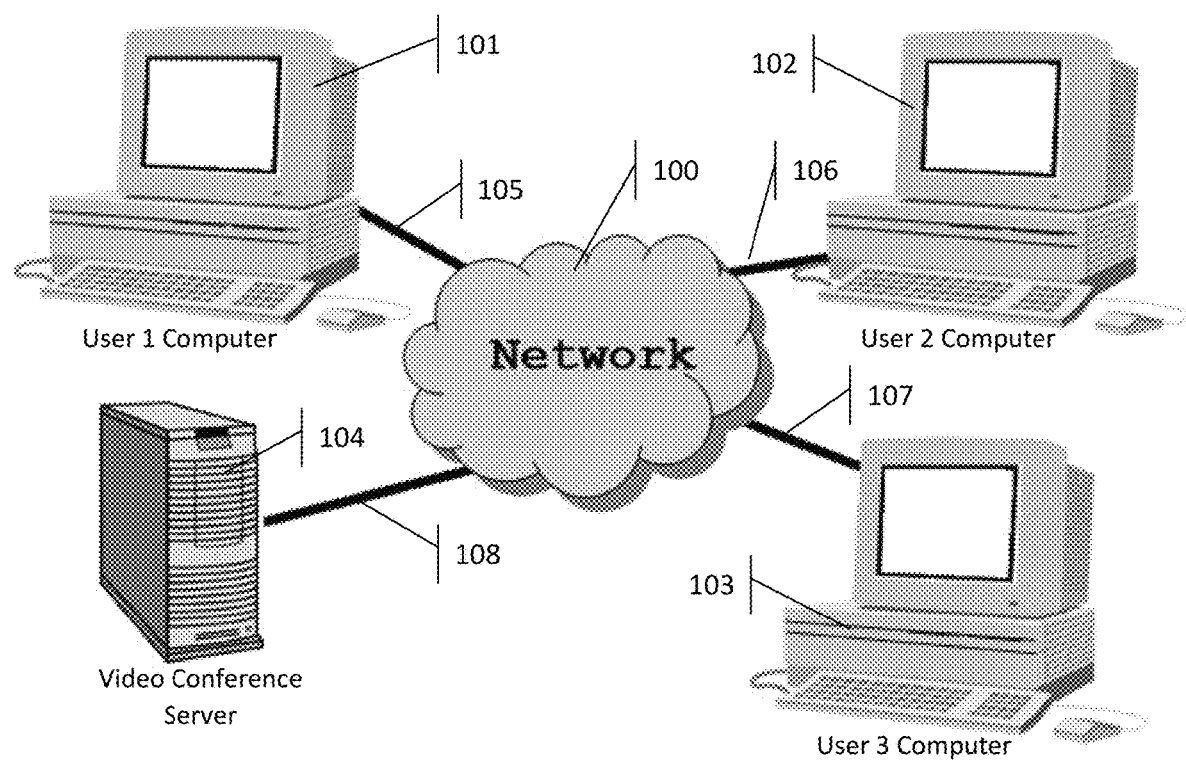
FIG. 1 shows a typical prior art video conferencing system that allows game players to see game play and to communicate with each other.

Embodiments of the invention are directed to a method and system for private and public communications among a group of individuals in different roles while playing an online game. Embodiments of the invention make use of a basic knowledge of video conferencing, electronic communication, and computer programming.

Some portions of the detailed descriptions that follow are presented in terms of processes and symbolic representations of operations on data bits within a computer memory. These descriptions and representations are the means used by those skilled in the data processing arts to convey the substance of their work most effectively to others skilled in the art. A process is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "communicating," "transmitting, "receiving," "executing," "passing," "determining," "generating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, floppy diskettes, optical disks, compact disc read-only memories (CD-ROMs), magneto-optical disks, optical disks, semiconductor read-only memories (ROMs), semiconductor random access memories (RAM), programmable read-only memories (PROM), erasable programmable read-only memories (EPROM), electrically erasable programmable read-only memories (EEPROM), magnetic cards, optical cards, flash memories, or the like.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention describes a system and method that allow poker players to be in separate locations while they play, but enables the poker players to see each other at the game table while talking to each other and giving audio commentary on the game that can be heard by observers or viewers but not by other players. There is a control that allows each player to select whether to give audio commentary only to the observers and viewers or to give audio commentary to the observers, viewers, and players. There is also a game master that controls overall access to audio and video and can mute or hide various players if they are found to be violating game rules or other constraints.

FIG. 1 is a diagram of a prior art video conferencing system in the exemplary form of the Network 100 that connects User 1 Computer 101 with User 2 Computer 102 and User 3 Computer 103 to Video Conference Server 104 via connections 105, 106, 107, and 108 respectively. Network 100 can be the Internet, a company intranet, or any other kind of computer network. Connections 105, 106, 107, and 108 can be wired connections such as Ethernet over category 5 (Cat5) cables or wireless connection such as Wi-Fi or other wired or wireless connections or combinations thereof. Video, audio, pictures, documents, control information, and other information are transmitted from video conferencing client software running on User 1 Computer 101 via the Network 100 to video conferencing server software running on Video Conference Server 104. The information is processed and relayed to video conference client software running on User 2 Computer 102 and User 3 Computer 103 where the information is displayed. Similarly, video, audio, pictures, documents, control information, and other information are transmitted from video conferencing client software running on User 2 Computer 102 via the Network 100 to video server software running on Video Conference Server 104 where the information is processed and relayed to video conference client software running on User 1 Computer 101 and to video conference client software running on User 3 Computer 103 where it is displayed on both computers. The system can consist of a minimum of two user computers and no maximum number of user computers except where the system is constrained by the bandwidth of Network 100, memory size or processing power of Video Conference Server 104, or other technical constraints that would be known to one of ordinary skill in the art.

The present invention is a specialized video conferencing system for game players, where users can be categorized as players, observers, viewers, and masters, each with different functionality. The present invention comprises five different applications: Client Observer App, Client Player App, Client Master App, Client Viewer App, and Game Server App. The Client Observer App is used by people observing the game in real time but not playing the game. The Client Player App is used by people playing the game. The Client Viewer App is used by people viewing a recording of the game. The Client Master App is used by people supervising the game. The Game Server App is run on a network server to control communication among all the running client apps.

Figure 2:
FIG. 2 shows the client display on a computer monitor of a typical prior art video conferencing system that allows game players to see game play and to communicate with each other.

FIG. 2 shows a prior art Video Conference Client App for allowing communication between participants. The software application runs on Client Computer 200. The Video Conference Client Application Display 201 incorporates a view of the participants. One such view of a participant is labeled Participant 202. Video Conference Client Application Display 201 can be arranged in different manners to show all participants, only the participant who is currently speaking, or some subset of participants as determined by internal settings of the software combined with user settings determined by each individual user of the video conference client software. At the bottom of the Video Conference Client Application Display 201, there are a set of Video Conference User Controls 203 that include an audio mute button and a video display button. The audio mute button allows the Video Conference Client App user to allow the audio from the user's local microphone to be heard by all other participants in the video conference or to mute themselves to all other participants. The video display button allows the Video Conference Client App user to allow the video from the user's local video camera to be seen by all other participants in the video conference or to block transmission of the video to all other participants (i.e., "hide" the user). Typically, there is also a single conference master user who can use their own Video Conference Client Master App to force the muting of audio from any other particular user or group of users to all other participants or to hide any particular user or group of users to all other participants.

As an exemplary description in this patent, the game of Texas Hold'Em poker is used for illustration purposes only. Other variations of poker as well as other multiplayer games such as chess, checkers, backgammon, or video games are also applicable. One of ordinary skill in the art would know that the differences in these games would be insubstantial with respect to how the present invention is implemented.

A basic, and simplified description of the game of Texas Hold'Em is as follows. The dealer deals each player two "hole cards" face down, which the player views but keeps hidden from the other players. After a round of betting, the dealer then deals three "common cards" face up on the table for all players to see. These first three cards are called the "flop." There is a second round of betting, after which the dealer deals another common card face up on the table. This card is called the "turn." After another round of betting, the dealer deals a final common card face up on the table. This card is called the "river." There is then one last round of betting for the hand. During a round of betting, a player may bet if no player has yet bet for this round, the player may "fold," which means exits from the hand and release their cards, the player may "check," which means make no bet if no player has yet bet in this round, the player may "call," which means bet the same amount of the bet of the previous player, or the player may "raise," which means increase the amount of the bet made by the previous player. At the end of all betting, the players who are still in the hand reveal their hole cards. The winning player is the one with the best poker hand consisting of any combination of 5 cards from among 7 cards consisting of their hole cards and the common cards.

Figure 3:
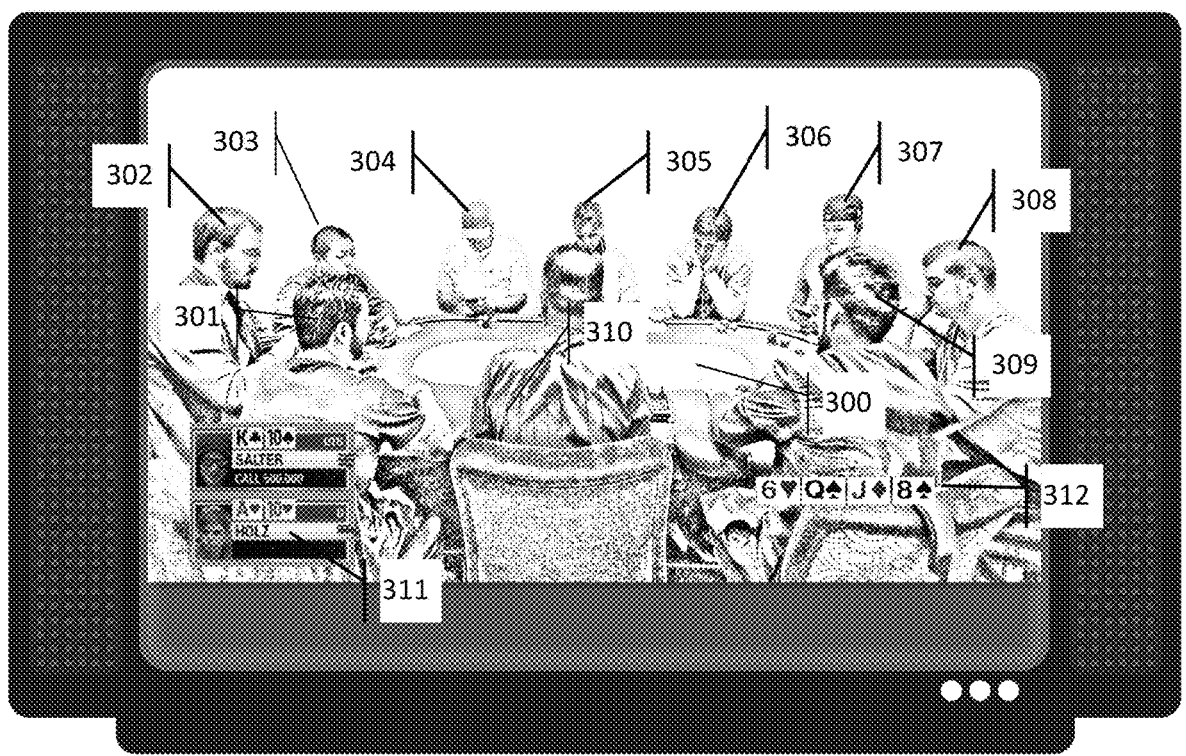
FIG. 3 shows a picture of a prior art television or Internet broadcast of a live action poker game.

FIG. 3 shows a picture of a prior art television or Internet broadcast of a live action Texas Hold'Em poker game. Poker Players 301 through 309 sit around the Poker Table 300. The Dealer 310 deals the cards. In one embodiment, a camera is embedded in the rail of Poker Table 300 in front of each player to record the player's cards. In another embodiment, a glass plate is embedded in the table in front of each player with a camera beneath it so that when the player rests their cards on the plate, the camera records the cards through the glass plate. In yet a third embodiment, there is an RFID receiver for each player that senses the RFID chip embedded in the player's cards to identify the cards. The cards of the players still in the game at any point, until the player has folded their hand, are displayed on the left side of the screen in Player Card Display 311. The common cards that have been placed on the table are displayed on the right side of the screen in Table Card Display 312.

Figure 4:
FIG. 4 shows one embodiment of an observer or viewer display for the present invention.

In this embodiment of the present invention, the observer and viewer see an identical display even though the application that controls the display is different and the user controls have some differences, as described later in this spec. FIG. 4 shows one embodiment of an Observer/Viewer Display 400 for the present invention, which shows each player, with a particular player labeled Player 401, and each player's hole cards, with a particular player's hole cards labeled Player Hole Cards 402, the Common Cards 403 on the table, and Observer/Viewer Controls 404. The Observer/Viewer Controls 404 allow an observer or viewer to select one particular player to listen to. The Observer/Viewer Controls 404 also allow an observer or viewer to listen to a commentator for the game who is not playing the game. The observer or viewer can switch between all available audio sources, consisting of all players and all other commentators. The Observer/Viewer Controls 404 also allow an observer or viewer to select one particular player to watch more closely. For example, the controls may allow one player's video to be enhanced by making it larger than the others on the display.

The Master Display looks exactly like Observer/Viewer Display 400 except there are additional controls (not explicitly shown) to mute any player's audio from reaching other players and observers or viewers, hide any player's video from reaching other players and observers or viewers, and to take any player out of the game, by disabling that player's client app, for violation of conditions of the game or other reasons.

Figure 5:
FIG. 5 shows one embodiment of a player display for the present invention.

FIG. 5 shows one embodiment of a Player Display 500 for the present invention. Like the Observer/Viewer Display 400, the Player Display 500 shows each player, with a particular labeled Player 401, and the Common Cards 403 on the table. The Player Display 500 also shows the Associated Player 501 and only shows Associated Player Hole Cards 503 for the particular player who is using the display, but does not show hole cards for any other players because that would take all of the skill out the game by displaying each players hidden cards to the other players. Also, there is a mouth veil bar on the video of each player that covers the players mouth, with an example labeled Mouth Veil Bar 504, so that each player can observe the other players and look for "tells," but the other players' lips cannot be read while they comment on the game to observers and viewers. A player can adjust his or her own mouth bar on the screen, using the Player Controls 502, so that the player can assume a personally comfortable position and adjust the bar over his or her mouth. The players have incentive for adjusting the bar correctly so as not to give away their comments about the play to the other players, which would otherwise result in a significant disadvantage.

One of ordinary skill in the art would know that alternatives for Mouth Veil Bar 504 are possible. One such alternative embodiment is to include video processing software in the Player Client App that includes a detector for detecting the player's mouth and a masker for covering the player's mouth or blurring the player's mouth on the video display of each other player. Another alternative embodiment is to have the players wear masks over their mouths, inserting a microphone, if necessary, to capture their audio comments. Many poker players in live games already cover their mouths with bandannas, sweatshirt collars, or stretchy sleeves, so this would not be seen as an unreasonable burden.

The Player Controls 502 allow a player to mute their own comments to the observers and viewers if necessary, for example to cover a cough or sneeze, though players would be encouraged to comment often throughout the game. The Player Controls 502 allow a player to communicate either to the observers and viewers or to the observers, viewers, and all other players in the game. For fairness, and to avoid collusion, players do not have an option to communicate directly to other players without also communicating to the observers and viewers. Player Controls 502 also allow a player to draw and write on the screen in order to illustrate concepts to the observers or viewers. The drawing and writing would be seen by observers and viewers but not by other players.

Figure 6:
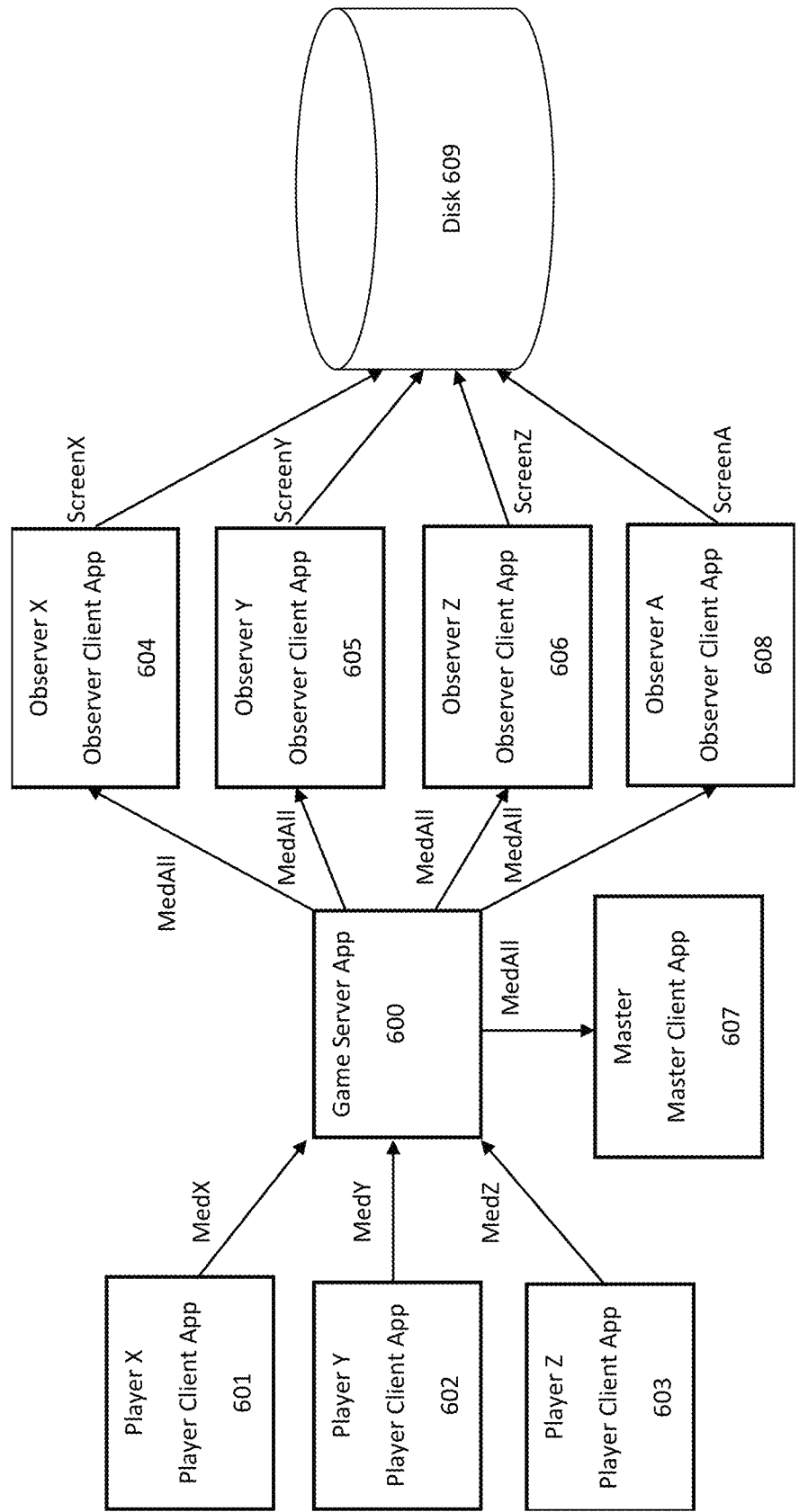
FIG. 6 is a diagram for one embodiment of media communication of the present invention between players, observers, and a master during normal operation.

FIG. 6 is a diagram of audio and video communication between players, observers, and master in one embodiment during normal operation. Throughout this specification, the term media will be used to mean a combination of audio and video. Player Client App for Player X 601, Player Client App for Player Y 602, and Player Client App for Player Z 603 all transmit media signals to Game Server App 600, represented by labels MedX, MedY, and MedZ, respectively. Game Server App 600 combines MedX, MedY, and MedZ into a signal labeled MedAll. Game Server App 600 transmits media signal MedAll, to Master Client App for Master 607. This allows the master to determine if any media is inappropriate and if so, mute any player, hide any player, or remove any player from the game.

Game Server App 600 also transmits media signal MedAll to Observer Client App for Observer X 604, Observer Client App for Observer Y 605, Observer Client App for Observer Z 606, and Observer Client App for Observer A 608. Observer X is always observing Player X. This means that if there is any enhanced video on the screen for a single player, Observer X sees the enhanced video for Player X. It also means that Observer X always hears audio from Player X. Similarly, Observer Y is always observing Player Y, Observer Z is always observing Player Z, and Observer A is always observing the active player, that being the one who is acting in the game (i.e., the one whose turn it is to bet, check, call, raise, or fold).

Observer Client App for Observer X 604 captures the screen showing the cards, the chips, the players, and the media for Player X and saves that screen capture, including audio, to Disk 609. Observer Client App for Observer Y 605 similarly saves its screen capture to Disk 609. Observer Client App for Observer Z 606 similarly saves its screen capture to Disk 609. Observer Client App for Observer A 607 captures the screen showing the cards, the chips, the players, and the media for each acting player and saves that screen capture, including audio, to Disk 609. Disk 609 resides on a separate computer from the computer that hosts the Observer Client App whereby storing the screen capture may involve first saving the screen capture locally and then transmitting the screen capture over a network from the Observer Client App to Disk 609.

Because broadcasting multiple players at multiple tables to a large number of observers in real-time requires a very large amount of network bandwidth, and can be very expensive when broadcasts are charged per observer, in this embodiment the number of observers is equal to the number of players plus one additional observer for each table. However, a large number of viewers may watch the game that was recorded by the various observers. Although the diagrams show only three players and four viewers, the model is easily understood by one of ordinary skill in the art as applying to configurations with two or more players and three or more viewers.

Figure 7:
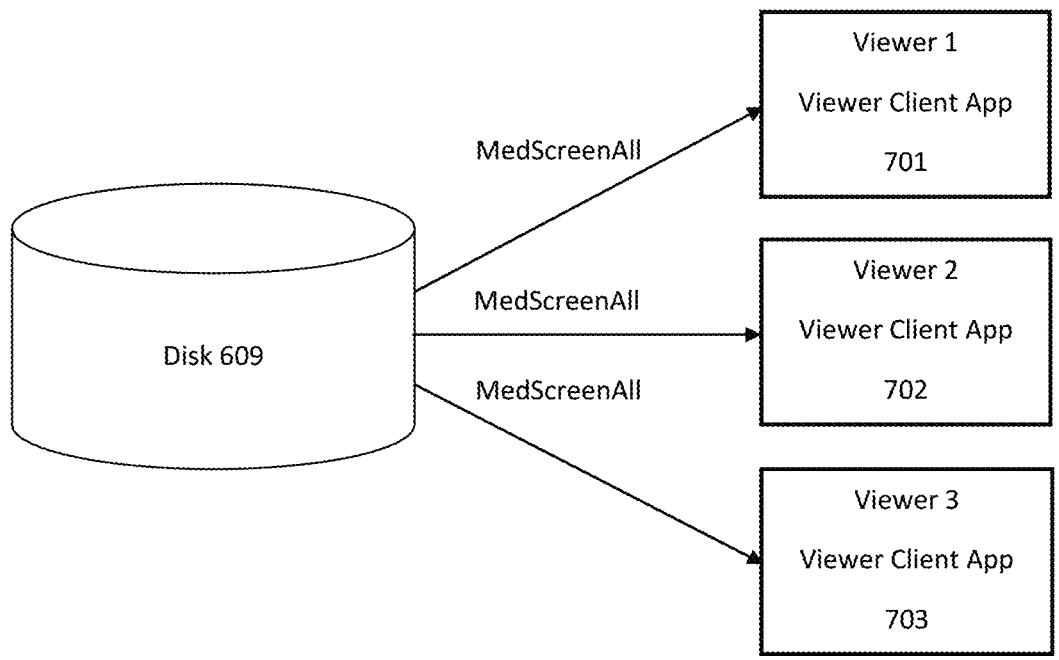
FIG. 7 is a diagram for one embodiment of media communication of the present invention to viewers.

FIG. 7 is a diagram of media communication to viewers in one embodiment of the present invention. The screens and audio have been captured for various perspectives and stored on Disk 609 by each observer as described above. The screens and audio of all observers are then combined into signal MedScreenAll and streamed on demand to each viewer. In other words, each viewer can watch the game play at any time. The viewer selects which observer's perspective to extract from the stream, using Viewer Controls 404, and the selected perspective is displayed via the Viewer Client App 400.

Figure 8:
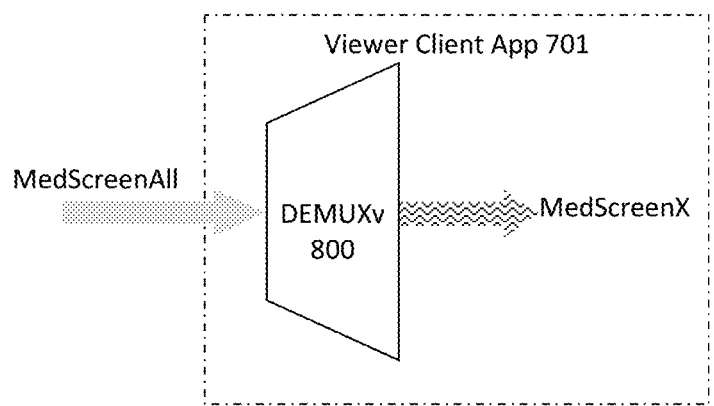
FIG. 8 is a diagram for one embodiment of an implementation of communication logic of the present invention inside a viewer client.

FIG. 8 is a diagram of an implementation of communication logic of the present invention inside Viewer Client App 701. In the example shown, the viewer has decided to watch and listen to Player X and so demultiplexer DEMUXv 800 is configured to extract screen capture signal MedScreenX, which includes video and audio of player X, from combined screen capture signal MedScreenAll, and send the signal to the viewer's display and speakers. At any time while watching the game, the viewer may decide to watch and listen to a different player and may click on a button on Viewer Controls 404 to reconfigure DEMUXv 800 to extract screen capture signal MedScreenY, for example, which includes video and audio of player Y, from combined screen capture signal MedScreenAll, and send the signal to the viewer's display and speakers.

Figure 9:
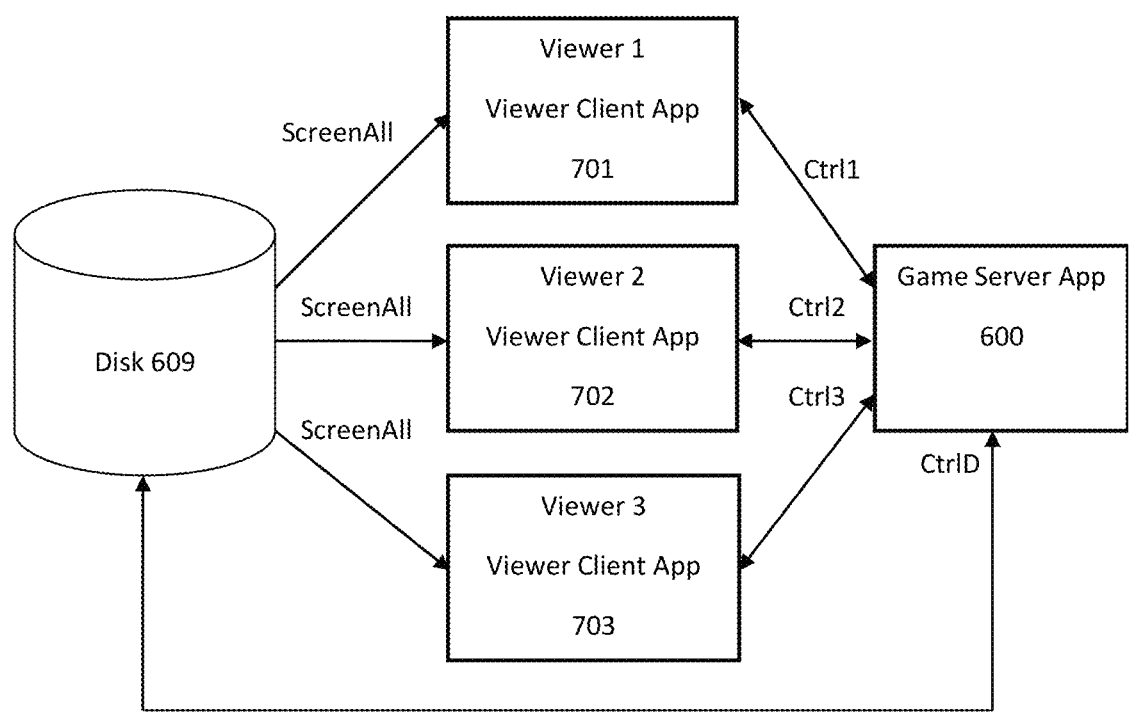
FIG. 9 is a diagram for one embodiment of the control communication of the present invention between the game server and the observer clients.

FIG. 9 is a diagram of the control communication of the viewers of the present invention. Each Viewer Client App transmits control selection information to the Game Server App 600, which in turn controls the communication of media between viewer clients and Disk 609. Control signals sent between Game Server App 600 and Viewer Client App 701 for Viewer 1 are labeled Ctrl1. Control signals sent between Game Server App 600 and Viewer Client App 702 for Viewer 2 are labeled Ctrl2. Control signals sent between Game Server App 600 and Viewer Client App 703 for Viewer 3 are labeled Ctrl3. Control signals sent between Game Server App 600 and Disk 609 are labeled CtrlD.

Figure 10:
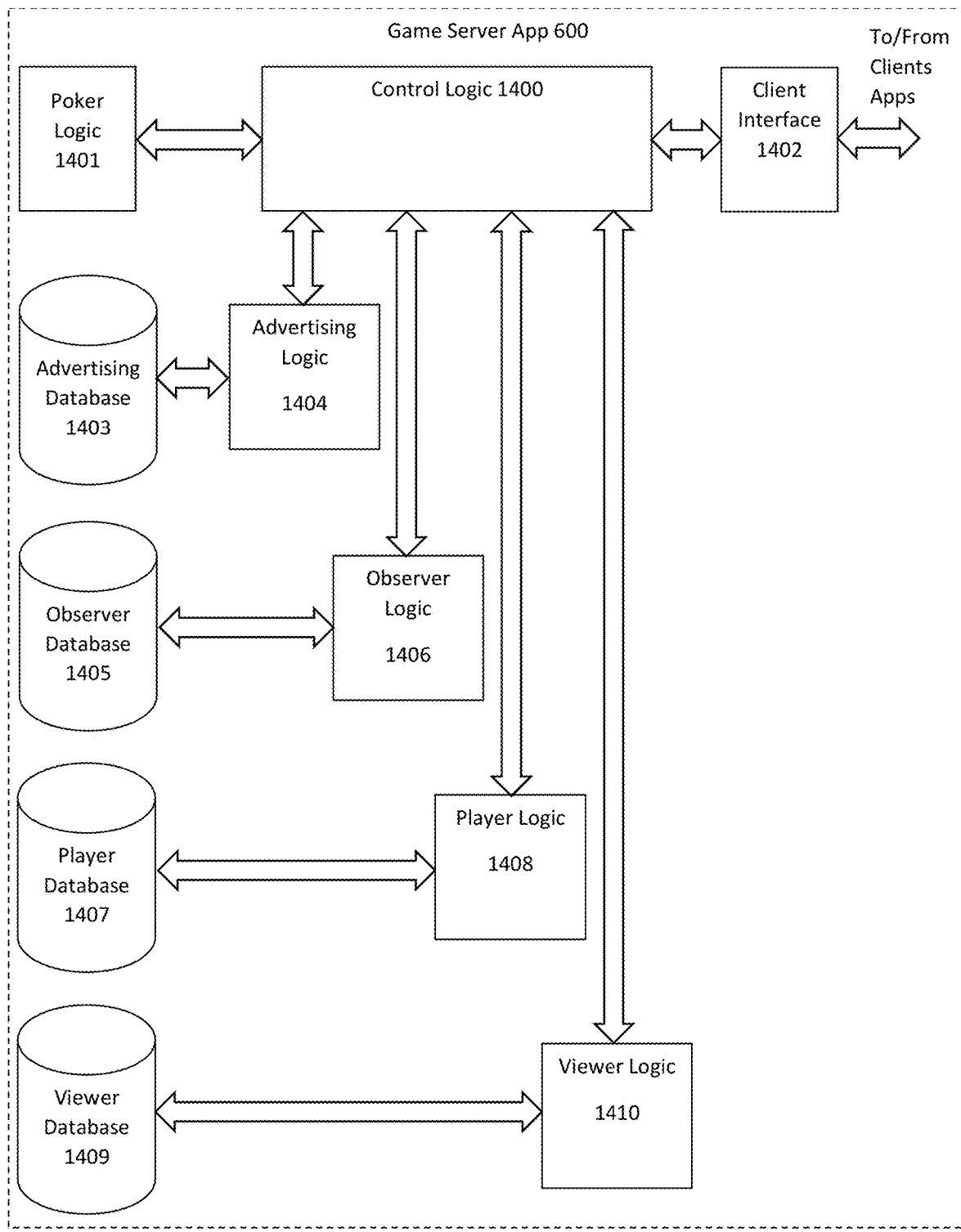
FIG. 10 is a diagram for one embodiment of the internal architecture of the game server application.

FIG. 10 is a diagram of the internal architecture of Game Server App 600. Control Logic 1400 contains the main control logic. Poker Logic 1401 implements all of the poker game play including dealing cards, running games, handling betting, timing play, and keeping track of chips. Client Interface 1402 communicates with all of the player, observer, viewer, and master client apps via a network. Advertising Database 1403 keeps track of ads from sponsors. Advertising Logic 1404 controls which clients see which advertisements and at which times during game play. Observer Database 1405 keeps track of information about all observers that have used the system. Observer Logic 1406 controls information entered into the Observer Database 1405 and extracted from it. Player Database 1407 keeps track of information about all players that have used the system. Player Logic 1408 controls information entered into the Player Database 1407 and extracted from it. Viewer Database 1409 keeps track of information about all viewers that have used the system. Viewer Logic 1410 controls information entered into the Viewer Database 1400 and extracted from it.

Advertisements from sponsors of the games can be transmitted to viewers via control by Game Server App 600 that are then displayed on each Viewer Display 400. A single advertisement can be transmitted to all viewers or to groups of viewers or to individual viewers based on their preferences. Such preferences can be determined by many different means including, but not limited to, a survey taken by the viewer when signing up for the system, the viewer's interactions with the system during game play, interaction of the viewer with previous advertisements, and other activities that are recorded on the viewer's computer, during and outside of game play, such as videos watched, products purchased, and items searched for. Advertisements can be transmitted at predetermined times under the control of the Game Server App 600, for example during breaks in the game play.

Observers, viewers, players, and masters can use their client app to query Player Database 1407 via control signals sent to Game Server App 600 to retrieve information about players that will be displayed on their app display. This allows observers, viewers, players, and master to see statistics about players' standing in the current game, lifetime winnings, total tournament entries, rankings in online poker, rankings worldwide, and other information about players.

One of ordinary skill in the art would know that the present invention can be implemented in hardware, software, or combinations thereof.

In the preceding description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

I claim:

1. A computer-implemented method for a game server to provide commentary on remote game play, the method comprising:
   receiving audio or video media from multiple players via a network;
   combining said received audio or video media into a combined audio or video media signal via a multiplexer;
   receiving from a master via said network a signal indicating one or more of said multiple players;
   removing audio or video media of said indicated one or more of said multiple players from said combined audio or video media, via a demultiplexer;
   displaying said combined audio or video media within a game application;
   capturing audio or video output of said game application as play is occurring;
   storing said captured audio or video output to a storage device;
   receiving a request from a remote viewer; and
   transmitting said stored captured audio or video output to said remote viewer.

* * * * *